Feb. 20, 1934.  E. R. EVANS ET AL  1,947,904
EMERGENCY LEVER PICK-UP AND RELEASE
Filed Oct. 26, 1931  3 Sheets-Sheet 2
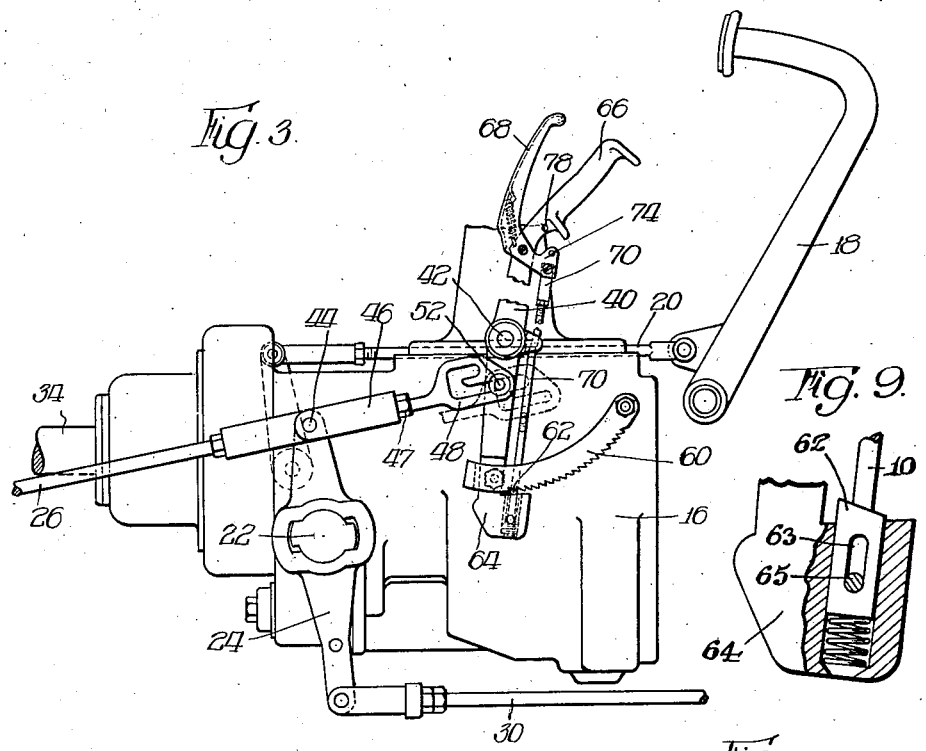
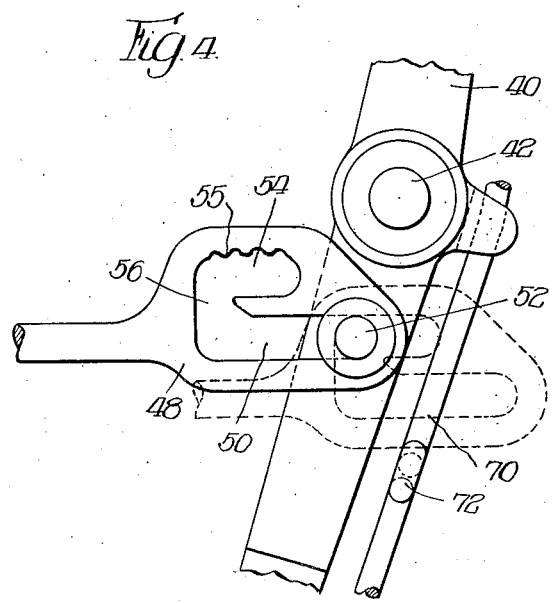
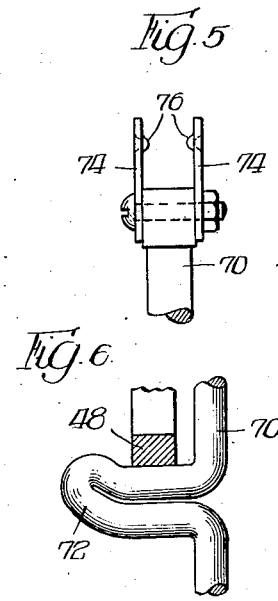
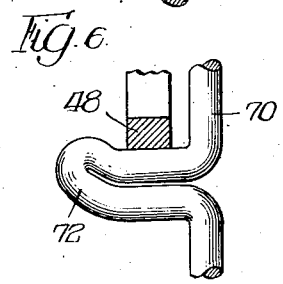
Inventors:
Edwin R. Evans,
Edward A. Rockwell, Feb. 20, 1934.   E. R. EVANS ET AL   1,947,904
EMERGENCY LEVER PICK-UP AND RELEASE
Filed Oct. 26, 1931   3 Sheets-Sheet 3
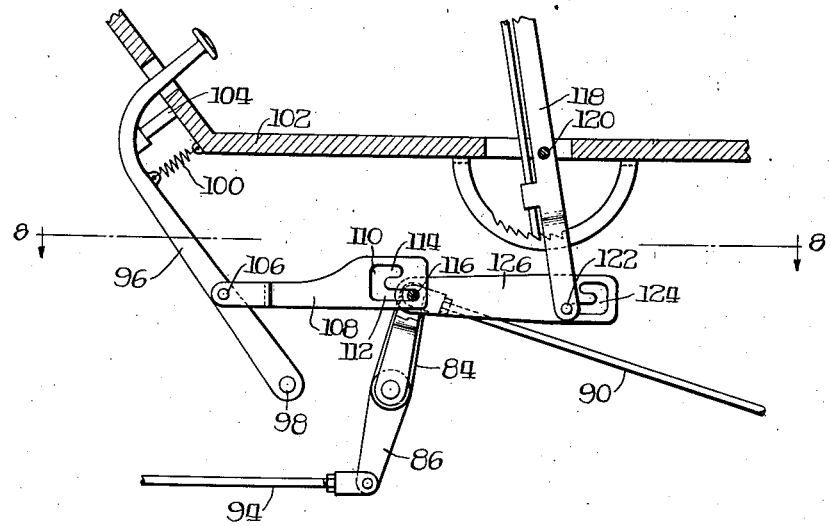
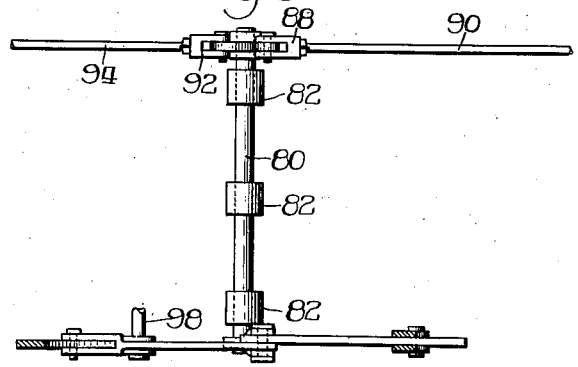
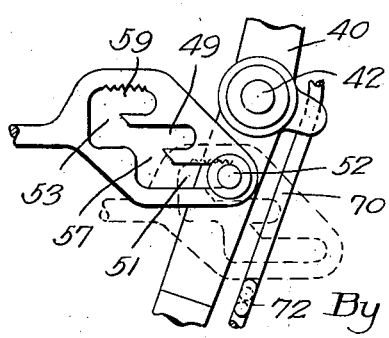
Inventors
Edward A. Rockwell
Edwin R. Evans Patented Feb. 20, 1934

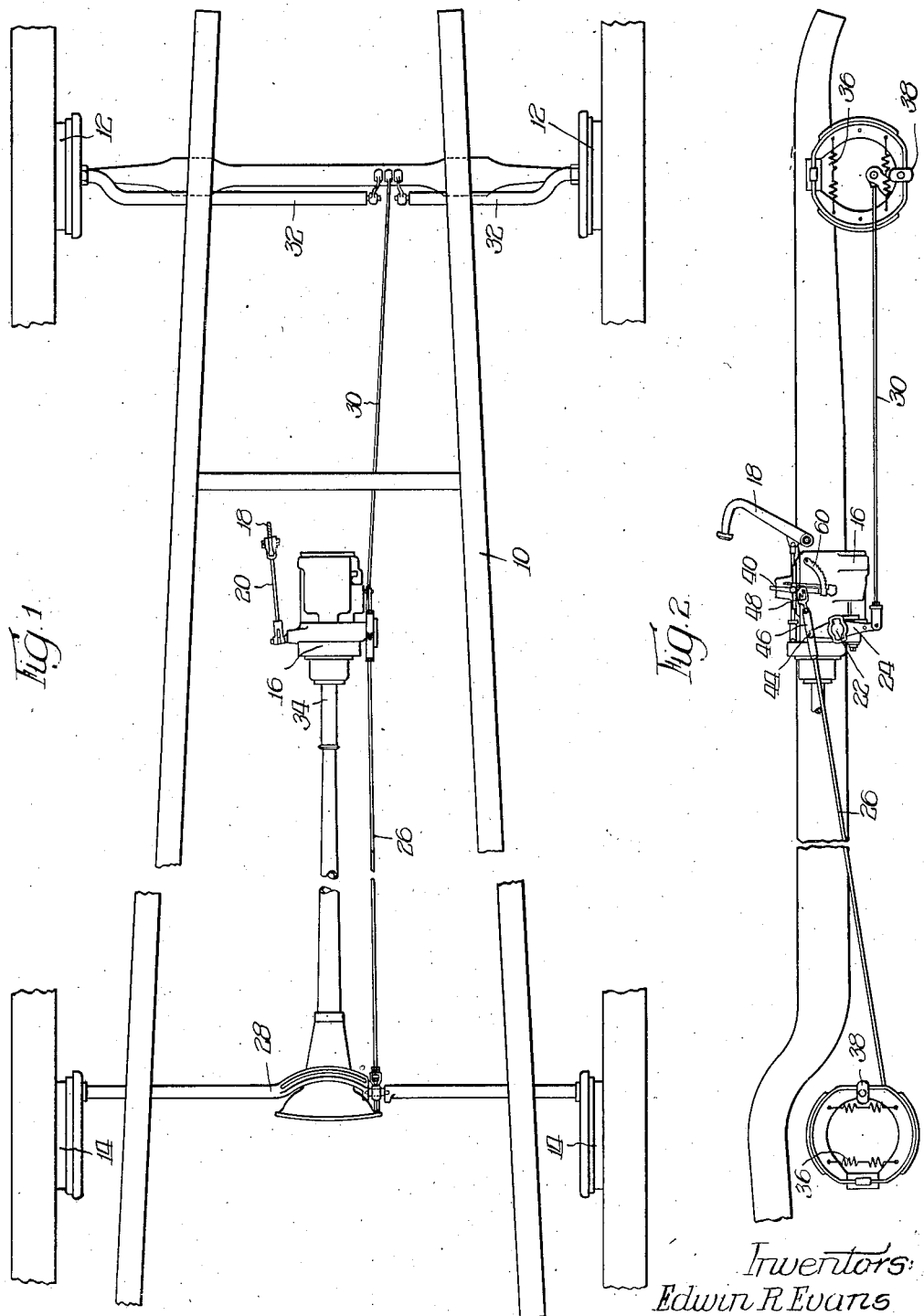

1,947,904

UNITED STATES PATENT OFFICE 1,947,904

EMERGENCY LEVER PICK-UP AND RELEASE

Edwin R. Evans and Edward A. Rockwell, Chicago, Ill.

Application October 26, 1931. Serial No. 571,050

12 Claims. (Cl. 188—196)

This invention relates to improvements in an automatic slack take-up device for use in a brake linkage. The improvements are particularly adaptable for use in association with a brake linkage for the four-wheel brakes of a motor vehicle which includes a power brake unit controlled by the pedal and an independent emergency lever control for the brakes.

Power braking systems for motor vehicles have been developed in which the movement of the pedal is substantially uniform while the movement of the output linkage from the power brake unit is progressively greater in accordance with the wear of the wheel brake linings. In such a system it is unnecessary to adjust the brake linkage unless the lost motion through the taking up of the slack by the power unit becomes too great. It is customary to connect the emergency lever to the brake linkage on the output side of the power brake unit with provision for lost motion in order that the actuation of the brakes may be carried out through operation of the pedal without moving the emergency lever from its normal inoperative position. As the brake linings wear, the lost motion may become so great that movement of the emergency lever will not be sufficient to properly actuate the wheel brakes unless some provision for adjustment is provided. In order, therefore, to provide continuously effective independent controls of the wheel brakes, it is highly desirable, and in some territories necessary to satisfy legal requirements, that an automatic adjustment or slack take-up means be provided in the connection between the emergency lever and the brake linkage.

It is therefore an object of the present invention to provide a connection between an emergency lever and the output brake linkage from a power brake unit which will automatically operate to take up excessive slack in order that the wheel brakes will always be under the control of the emergency lever.

It is further an object of the present invention to provide a brake linkage including a power brake unit controlled by the pedal and an emergency lever independently connected to the output side of the brake linkage in which excessive slack through wear of the brake linings is taken up between the wheel brakes and the emergency lever during the actuation of the brakes by the pedal instead of during the operative movement of the emergency lever.

Further objects and advantages of the present improvements will be more readily apparent from the following description taken in connection with the attached drawings, in which—

Figure 1 is a plan view of the improved brake system associated with a chassis of a motor vehicle;

Figure 2 is an elevation of the braking system illustrated in Figure 1;

Figure 3 is an enlarged elevation illustrating the power brake unit and the emergency lever control;

Figure 4 is an enlarged detail view of the automatic slack take-up connection to the emergency lever;

Figure 5 is a detail view of a portion of a locking device for maintaining ineffective the automatic slack take-up;

Figure 6 is a detail view of a portion of the resetting and locking mechanism;

Figure 7 is an elevation of a modified arrangement of the brake linkage; and

Figure 8 is a plan view of the arrangement shown in Figure 7,

Figure 9 is a detail view partially in section showing the connection of the rod to the pawl; and, Figure 10 is a view similar to Figure 4 showing a modified construction.

In Figures 1 and 2 we show a chassis frame 10 having front wheel brakes 12—12, rear wheel brakes 14—14 and a power brake unit 16. The foot pedal 18 controls the input to the power brake unit 16 through the pull rod 20. The output rock shaft 22 of the power braking unit carries, with provision for lost motion, a double arm brake lever 24 having connected to its upwardly extending arm a rearwardly extending pull rod 26 connected to the cross shaft 28 for actuating the rear wheel brakes 14. The lower arm of the brake lever 24 is connected by the pull rod 30 to the front cross shafts 32—32 for actuating the front wheel brakes 12.

It will be understood that the power brake unit may be of the mechanical type associated with the propeller shaft 34 of the vehicle, as disclosed in the application of Edward A. Rockwell, Serial No. 224,846, filed October 8, 1927. In such a device the operation of the pedal 18 brings into action a primary braking device in the power brake casing which operates during either direction of rotation of the propeller shaft 34 to cause movement of the output rock shaft in a direction to actuate the wheel brakes with amplified force. The pull-back springs 36, shown associated with the wheel brakes and additional pull-back springs which may be employed, if necessary, serve to hold the brake linkage in normal inoperative position. The brake actuating cams 38 will normally be returned to mid-positions. As the wheel brake linings wear, it will be necessary to turn the brake cams 38 through progressively greater angles to produce the full actuation of the wheel brakes and the travel of the brake lever 24 will therefore become increasingly greater as the linings wear. However a very slight wear occurs in the primary brake device forming the power brake unit and the travel of the brake pedal 18 remains the same. It is therefore unnecessary to adjust the linkage between the pedal and the wheel brakes since the power brake is capable of taking up all the slack during operation of the brakes.

As shown more clearly in Figure 3, it is customary to provide an emergency lever 40 carried by a fixed pivot 42 which is pivotally connected at 44 to the upwardly extending arm of the brake lever 24 at the same point as the connection of the rear pull rod 26. The connection generally comprises an adjustable link having provision for lost motion either at the end connected to the emergency lever 40 or at the end connected to the brake lever 24. We show in Figure 3 a link 46 having provision for adjustment by the nut 47 and having at one end an eye-piece 48 provided with a bottom slot 50 adapted to receive a pin 52 carried by the emergency lever 40.

The provision for lost motion between the output rock shaft 22 of the power brake unit and the double arm brake lever 24 permits the control of the wheel brakes by the emergency lever 40 without the movement of the rock shaft 22, which is desirable in case of injury to the power brake mechanism. With the emergency lever in inoperative position, actuation of the wheel brakes by the power brake unit will cause clockwise movement of the brake lever 24 and the eye-piece 48 will slide relative to the pin 52. As the wheel brake linings wear, the movement of the eye-piece 48 relative to the pin 52 will become increasingly greater and if provision for adjustment were not provided, movement of the emergency lever to its full extent might not be sufficient to take up the slack in the brake linkage and produce proper actuation of the wheel brakes.

We have therefore shown the eye-piece as being provided with a second slot 54 above and parallel to the slot 50 and the slots 50 and 54 are joined at the left-hand end by a vertical slot 56, and it will be noted that the upper slot 54 is shorter than the lower slot 50. Therefore during operation of the wheel brakes by the power brake unit, as soon as sufficient wear of the wheel brake linings has occurred, the eye-piece 48 will move relative to the pin 52 until the pin 52 is able to pass through the vertical slot 56 and enter the upper and shorter slot 54. This action will occur through gravital dropping of the eye-piece 48 permitted through the pivotal connection 44 of the link 46. The eye-piece 48 will therefore reach the position indicated by dotted lines in Figures 3 and 4, and, upon release of the wheel brakes, the right-hand end of the slot 54 will act as a stop and prevent return of the brake actuating cams to their normal mid-positions. The cams in their released positions will then be displaced a certain amount from normal positions to take up a sufficient amount of the slack occasioned through wear of the brake linings to enable proper control of the wheel brakes by movement of the emergency lever.

The emergency lever disclosed is of the ordinary type and includes locking means for holding the lever in brake-set position comprising the fixed rack 60 engaged by the spring-pressed lug 62 carried by the depending arm 64 of the lever 40. The handle 66 of the lever has pivotally attached thereto a releasing lever 68 which releases the engagement of the lug 62 with the rack by means of a push rod 70. The push rod 70 has a bent end 65 fitting into a slot 63 formed in the pawl 62. In adapting this construction to an improved cooperation with the slack take-up device, we have shown means according to which the slack take-up device may be rendered inoperable through movement of the lever 68 or may be reset after the pin 52 has entered the upper slot 54.

As shown in the detail view of Figure 6, the push rod 70 is formed with a lateral projection 72 extending beneath the eye-piece 48. In the normal position of the push rod 70, as shown in Figure 3, the eye-piece 48 is free to drop for taking up the slack but by moving the lever 68 in a counterclockwise direction, the projection 72 of the push rod is raised into position to hold the eye-piece 48 against dropping into its lowered position and the push rod 70 may be maintained in such position through the locking spring arms 74, shown in detail in Figure 5, which carry detents 76 engaging recesses 78 formed in the handle 66. The raising movement of the rod 70 relative to the pawl 62 is permitted by the provisions of slot 63. It will be readily apparent that in order to reset the eye-piece 48 to bring the pin 52 into the lower slot, it is only necessary to apply the brakes in the usual manner by the pedal and power brake device and then turn the lever 68 thereby raising the push rod 70 and raising the eye-piece 48 through cooperation with the projection 72.

As illustrative of a further embodiment of our invention adapted to the usual pedal-controlled brake linkage with independent emergency control, an arrangement may be provided as illustrated in Figures 7 and 8. In this construction there is a brake actuated rock shaft 80 supported by suitable bearings 82 on the frame of the vehicle. One end of the shaft 80 carries a lever arm 84, the other end of the shaft has a double arm lever 86 connected at its upper end by the clevis connection 88 to the rearwardly extending pull rod 90 and connected at its lower end by a clevis extension 92 to the forwardly extending pull rod 94. The usual brake pedal 96 is carried by fixed pivot 98 which may be, if so desired, coaxial with the rock shaft 80 and is normally held in released position by spring 100 extending between the pedal and a fixed point on the floor board 102. The spring 100 holds the pedal in engagement with a fixed stop 104. The pedal has pivotally connected thereto at point 106 a link 108 which has a slotted opening 110 therein formed similar to the disclosure in Figures 3 and 4, as previously described. Thus the bottom slot 112 is longer than the upper slot 114. A pin 116 is carried by the lever arm 84 normally resting at the rearward end of the lower slot 112 since the brake linkage is normally held in released position by the usual pull back springs (not shown).

It will be evident that the application of the brake pedal will serve to apply the brakes by rocking the shaft 80 through pulling on the pin 116 and there will be no movement of the pin 116 relative to the slots during normal application of the brakes by the pedal. However, the emergency lever 118 which is carried by a fixed pivot 120 has a pin 122 at its lower end received within the slotted opening 124 of a link 126 which is pivotally connected by pin 116 to the lever arm 84. The slotted opening 124 is formed similar to the slotted opening 110 but faces in the opposite direction and the pin 122 will normally rest at the forward end of the bottom slot. Therefore, during application of the brakes by the pedal, the link 126 will move relative to the emergency lever and if the slack in the brake linkage is sufficient, due to wear of the brakes, the pin 122 will reach the forward end of the bottom slot and the link 126 will drop by gravity so that the pin 122, upon release of the brakes, will rest at the forward end of the upper slot and the linkage will therefore be prevented from returning to its full released position. The pin 116 will then be slightly forward of the rear end of the bottom slot 112 in link 108. Subsequent application of the brakes by the pedal will have no effect in taking up further slack. But if the brakes are applied by the emergency lever, the pin 116 will be moved forward relative to the link 108, which will remain in stationary position, and if there is still sufficient slack in the brake linkage, the pin 116 will reach the forward end of the bottom slot in link 108 and the link 108 will drop by gravity so that the pin 116 will reach the upper slot.

Upon release of the brakes the pin 116 will return to the rear end of the upper slot 114 of link 108. All of the slack will then be taken up. It will be understood however that the number and lengths of the slots in the links 108 and 126 may be designed to take up as large amount of slack as may occur and the operator will therefore have complete control of his brakes independent of wear of the brake linings without making any adjustments for the wear. For example I have illustrated in Figure 10 a modified form of slack take-up link 49 having three horizontal slots 51, 55 and 59 and two vertical slots 57 and 53. It will be apparent that the pin 52 will first slide in the slot 51 until the link drops the first step bringing the pin 52 into the slot 55. After more slack has occurred, the link will drop again to bring pin 52 into the upper slot 59.

It may be desirable to provide means for indicating to the operator of the vehicle that the automatic slack take-up device has operated to take up a portion of the slack thereby advising that the brake should be adjusted, since the device is intended principally for a safety measure and not to avoid the normal adjustment for wear of the brakes. Therefore we have shown in Figure 4 a corrugated face 55 on the top part of the upper slot 54 in the link 48. Thus if the pin 52 moves into the upper slot 54, the corrugated face resting upon the pin 52 and sliding relative thereto, will produce a slight noise sufficient to warn the operator. Various other constructions may be employed to serve the same purpose of indication that the brakes should be adjusted.

It will be understood that various modifications may be restorted to without departing from the scope of the invention as expressed in the appended claims and that the arrangement disclosed is adaptable to various types of brake linkages, but especially those in which there is a power unit of the mechanical or vacuum type, which is normally controlled by the pedal and in which an emergency lever is connected to the brake linkage between the power unit and the wheel brakes and in which it is desired to maintain the effective control of the brakes by the emergency lever at any time.

We claim:

1. In a vehicle brake control, a brake lever, a power brake unit controlled by the brake lever, means transmitting the operative movement of said power brake to the vehicle brake, an independent brake lever and means connecting said independent brake lever to said first-named means, said second named means being automatically operable to take up slack during the application of the brake by the first mentioned brake lever.

2. Controlling mechanism for vehicle wheel brakes comprising a brake pedal, a power brake unit controlled by said brake pedal, brake linkage from said power brake to the wheel brakes, an emergency lever and means connecting said emergency to said brake linkage automatically operable to take up slack during the application of the brakes by said pedal.

3. Vehicle brake mechanism comprising a brake pedal, a power brake unit, an output rock shaft extending from said power brake unit, a brake lever coupled to said rock shaft with provision for relative lost motion in one direction and means for connecting said brake lever to the wheel brakes, an emergency lever and means connecting said emergency lever to said brake lever including means for automatically taking up slack during the applying movement of said brake lever through operation of said power brake unit.

4. In a vehicle brake mechanism a pedal control for actuating the wheel brakes, an emergency lever control for independently actuating the wheel brakes and means operable during the application of the brake applying pedal control for automatically taking up the slack in the emergency lever control.

5. In vehicle brake mechanism, a brake linkage for actuating the vehicle wheel brakes, power braking means for controlling the operation of said brake linkage, means controllable by the operator for bringing the power braking means into action, an independent brake lever for actuating the brake linkage, a link connecting said lever to said brake linkage having a lost motion slot therein permitting movement of said brake linkage by said power braking means without movement of said lever, said link having a second lost motion slot shorter than said first mentioned slot and adapted to act as a stop to displace the brake linkage from its normal released position and take up the slack, said link being automatically shiftable to bring said second slot into operation when sufficient wear of the wheel brakes has occurred, to maintain proper control of the wheel brakes by said independent lever.

6. In vehicle brake mechanism, a brake linkage for actuating the vehicle wheel brakes, power brake mechanism for controlling the actuation of said brake linkage, an emergency brake lever, a link connecting the emergency lever to said brake linkage, said link including a pin and slot lost motion connection permitting movement of the brake linkage by the power braking mechanism without movement of said emergency lever, said link having a second shorter slot and being capable of automatic shifting to bring said pin into engagement with the shorter slot to take up slack occasioned by wear of the wheel brakes.

7. In vehicle brake mechanism, brake linkage for actuating the wheel brakes, power brake mechanism for controlling the actuation of said brake linkage, an emergency brake lever for independently actuating said brake linkage, an automatic slack take-up connection between said emergency lever and said brake linkage and means carried by the emergency lever operable for resetting the slack take-up device to its normal position.

8. In vehicle brake mechanism, brake linkage for actuating the vehicle wheel brakes, power braking mechanism for controlling the actuation of said brake linkage, an emergency lever for independently actuating said brake linkage, a link connection between said emergency lever and said brake linkage, means for automatically shortening the effective link connection to take up slack occasioned by wear of the vehicle wheel brakes and means carried by the emergency lever for returning said link to its normal condition of operation.

9. In vehicle brake mechanism, brake linkage for actuating the vehicle wheel brakes, power brake mechanism for controlling the actuation of said brake linkage, an emergency lever for independently controlling the actuation of said brake linkage and a gravital operable slack take-up connection between said lever and said brake linkage.

10. In a vehicle brake linkage, a brake lever, connections from said brake lever to a set of brakes, a brake pedal connected to actuate said brake lever, an emergency lever connected to independently actuate said brake lever and means for taking up slack in the emergency lever connection during applying movement of the pedal.

11. In a vehicle brake linkage, a brake lever, connections from said brake lever to a set of brakes, a brake pedal connected to actuate said brake lever, an emergency lever connected to independently actuate said brake lever and means for taking up slack in the pedal connection during applying movement of the emergency lever.

12. In a vehicle brake linkage, a brake lever, connections from said brake lever to a set of brakes, a brake pedal connected to actuate said brake lever, an emergency lever connected to independently actuate said brake lever, means for taking up slack in the emergency lever connection during applying movement of the pedal and means for taking up slack in the pedal connection during applying movement of the emergency lever.

EDWIN R. EVANS.
EDWARD A. ROCKWELL.